United States Patent
Cotoros (10) Patent No.: US 10,536,639 B2
(45) Date of Patent: *Jan. 14, 2020

(54) SYSTEMS AND METHODS FOR TRANSLATIONAL MOTION CORRECTION

(71) Applicant: GoPro, Inc., San Mateo, CA (US)

(72) Inventor: Ingrid A. Cotoros, Hillsborough, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,123

(22) Filed: May 21, 2019

(65) Prior Publication Data

US 2019/0273868 A1   Sep. 5, 2019

Related U.S. Application Data (63) Continuation of application No. 15/698,072, filed on Sep. 7, 2017, now Pat. No. 10,341,562.

(51) Int. Cl.
 *H04N 5/232* (2006.01)
 *G06T 5/00* (2006.01)
 *H04N 13/00* (2018.01)

(52) U.S. Cl.
 CPC ......... *H04N 5/23254* (2013.01); *G06T 5/002* (2013.01); *H04N 5/23238* (2013.01); *H04N 5/23258* (2013.01); *H04N 5/23267* (2013.01); *G06T 2207/10016* (2013.01); *G06T 2207/20182* (2013.01); *H04N 2013/0081* (2013.01)

(58) Field of Classification Search
 CPC ........... H04N 5/23254; H04N 5/23267; H04N 5/23258; G06T 5/002; G06T 2207/20182; G06T 2207/10016
 USPC .......... 348/208.4, 208.99, 99–208.16, 219.1; 396/13, 52–55; 359/554–557
 See application file for complete search history.

(56) References Cited

U.S. PATENT DOCUMENTS

| | | | |
|---|---|---|---|
| 7,705,884 B2 | 4/2010 | Pinto | |
| 8,743,222 B2 | 6/2014 | Hamalainen | |
| 2007/0132856 A1* | 6/2007 | Saito | ................. H04N 5/23248 348/208.99 |
| 2017/0034410 A1* | 2/2017 | Yoo | .................... H04N 5/23216 |

* cited by examiner

*Primary Examiner* — Lin Ye
*Assistant Examiner* — Chan T Nguyen
(74) *Attorney, Agent, or Firm* — Esplin & Associates, PC (57) ABSTRACT

Video information generated by an image sensor for a capture period and motion information of the image sensor during the capture period may be obtained. The video information may define images of a video based on light received within a field of view of an image sensor during the capture period. Relative positions of the image sensor between different moments within the capture period may be estimated based on the motion information. Depth information for a portion of an environment of the image sensor may be determined based on the video information generated at the different moments and the relative positions of the image sensor between the different moments, or based on stereo depth mapping. Translational motion correction may be applied to one or more of the images based on the depth information and the relative positions of the image sensor to warp the image(s) and stabilize the video.

20 Claims, 7 Drawing Sheets

SYSTEMS AND METHODS FOR TRANSLATIONAL MOTION CORRECTION

FIELD

This disclosure relates to warping images of videos to provide translational motion correction with application to image stabilization.

BACKGROUND

A camera that captures a video may move (e.g., up, down, left, right) during the capture of the video. Motion of the camera during the capture of the video may cause the playback of the video to appear jerky/shaky.

SUMMARY

This disclosure relates to translational motion correction with application to electronic image stabilization. Video information generated by an image sensor for a capture period, motion information of the image sensor during the capture period, and/or other information may be obtained. The video information may define images of a video based on light received within a field of view of an image sensor during the capture period. Relative positions of the image sensor between different moments within the capture period may be estimated based on the motion information and/or other information. Depth information for a portion of an environment of the image sensor may be determined based on the video information generated at the different moments, the relative positions of the image sensor between the different moments, the video information generated by multiple image sensors, and/or other information. A translational motion correction may be applied to one or more of the images based on the depth information, the relative positions of the image sensor, and/or other information. The translational motion correction may warp the one or more of the images to compensate for translational motion of the image sensor during the capture period to stabilize the video.

A system that provides translational motion correction may include one or more processors, and/or other components. The processor(s) may be configured by machine-readable instructions. Executing the machine-readable instructions may cause the processor(s) to facilitate providing translational motion correction. The machine-readable instructions may include one or more computer program components. The computer program components may include one or more of a video information component, a motion information component, a position component, a depth information component, a correction component, and/or other computer program components. In some implementations, the computer program components may include an occlusion component.

The video information component may be configured to obtain video information and/or other information. Obtaining the video information may include one or more of accessing, acquiring, analyzing, determining, examining, locating, receiving, retrieving, reviewing, storing, and/or otherwise obtaining the video information. The video information component may obtain video information from one or more locations. The video information may have been generated by an image sensor. The video information may define images of a video based on light received within a field of view of the image sensor during a capture period. The video information component may obtain video information during capture of the video and/or after capture of the video.

The motion information component may be configured to obtain motion information of the image sensor and/or other information. Obtaining the motion information may include one or more of accessing, acquiring, analyzing, determining, examining, locating, receiving, retrieving, reviewing, storing, and/or otherwise obtaining the motion information. The motion information of the image sensor may characterize motion of the image sensor during the capture period. In some implementations, the motion information may characterize the motion of the image sensor along one or more of three axes that are perpendicular to each other. In some implementations, the motion information may be generated by one or more motion sensors and/or other sensors. A motion sensor may include one or more of an inertial measurement unit, an accelerometer, a gyroscope, a magnetometer, a distance sensor, a position sensor, and/or other motion sensors.

The position component may be configured to estimate relative positions of the image sensor between different moments within the capture period based on the motion information and/or other information. The position component may determine a change in position of the image sensor between different moments within the capture period. The change in positions of the image sensor may be characterized by one or more distances between different positions of the image sensors at different moments within the capture period.

The depth information component may be configured to determine depth information for one or more portions of an environment of the image sensor based on the video information generated at the different moments, the relative positions of the image sensor between the different moments, the video information generated by multiple image sensors, and/or other information. In some implementations, determining the depth information for the portion of the environment of the image sensor may include: (1) determining a distance between the relative positions of the image sensor at two of the different moments, the two of the different moments including a first moment and a second moment; (2) obtaining a first image, the first image defined by the video information generated by the image sensor based on the light received within the field of view of the image sensor at the first moment; (3) obtaining a second image, the second image defined by the video information generated by the image sensor based on the light received within the field of view of the image sensor at the second moment; and (4) determining the depth information for one or more objects represented in the first image and the second image based on (i) the distance between the relative positions of the image sensor at the first moment and the second moment, and (ii) a comparison of the first image and the second image.

The correction component may be configured to apply a translational motion correction to one or more of the images based on the depth information, the relative positions of the image sensor, and/or other information. The translational motion correction may warp the one or more of the images to compensate for translational motion of the image sensor during the capture period and to stabilize the video.

In some implementations, the translational motion correction may be applied to the one or more of the images further based on distances between the image sensor and the portion of the environment of the image sensor. In some implementations, applying the translational motion correction further based on the distances between the image sensor and the portion of the environment of the image sensor may include: (1) obtaining a threshold distance; (2) identifying pixels of the one or more of the images corresponding the portion of the environment located within the threshold distance of the image sensor; and (3) warping the identified pixels of the one or more of the images.

The occlusion component may be configured to determine an occlusion map based on the depth information, the translational motion correction, and/or other information. The occlusion map may characterize one or more gap regions within a given image of the one or more of the images after the application of the translational motion correction. In some implementations, the one or more gap regions may be filled based on one or more pixels of the given image. In some implementations, the one or more gap regions may be filled based on one or more pixels of an image other than the given image.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
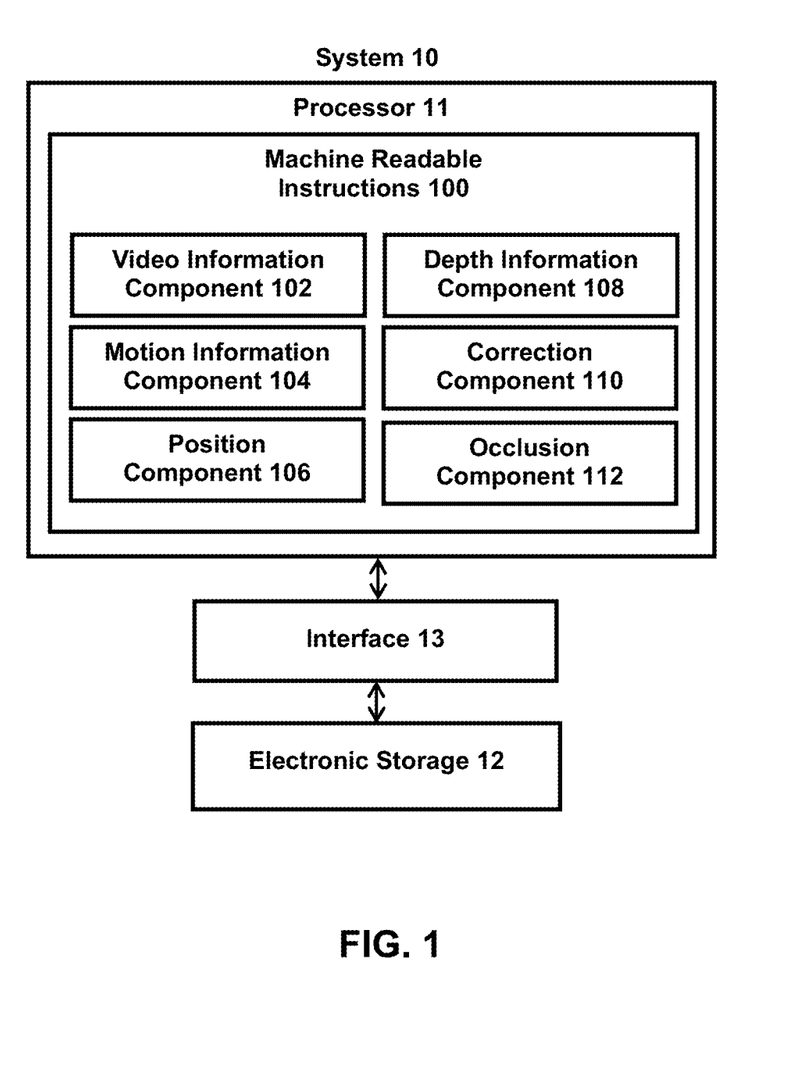
FIG. 1 illustrates a system that provides translational motion correction.

FIG. 1 illustrates a system 10 for providing translational motion correction. The system 10 may include one or more of a processor 11, an electronic storage 12, an interface 13 (e.g., bus, wireless interface), and/or other components. Video information generated by an image sensor for a capture period, motion information of the image sensor during the capture period, and/or other information may be obtained by the processor 11. The video information may define images of a video based on light received within a field of view of an image sensor during the capture period. Relative positions of the image sensor between different moments within the capture period may be estimated based on the motion information and/or other information. Depth information for a portion of an environment of the image sensor may be determined based on the video information generated at the different moments, the relative positions of the image sensor between the different moments, the video information generated by multiple image sensors, and/or other information. A translational motion correction may be applied to one or more of the images based on the depth information, the relative positions of the image sensor, and/or other information. The translational motion correction may warp the one or more of the images to compensate for translational motion of the image sensor during the capture period to stabilize the video The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, images, videos, image sensors, fields of view of image sensors, motion information, motion of image sensors, positions of image sensors, environments of image sensors, depth information, translational motion corrections, occlusion maps, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate providing translational motion correction. The machine readable instructions 100 may include one or more computer program components. The machine readable instructions 100 may include one or more of a video information component 102, a motion component 104, a position component 106, a depth information component 108, a correction component 110, and/or other computer program components. In some implementations, the machine readable instructions 100 may include an occlusion component 112.

The video information component 102 may be configured to obtain video information and/or other information. Obtaining the video information may include one or more of accessing, acquiring, analyzing, determining, examining, locating, receiving, retrieving, reviewing, storing, and/or otherwise obtaining the video information. The video information component 102 may obtain video information from one or more locations. For example, the video information component 102 may obtain the video information from a storage location, such as the electronic storage 12, electronic storage of information and/or signals generated by an image sensor, electronic storage of a device accessible via a network, and/or other locations. The video information component 102 may obtain the video information from a hardware component (e.g., an image sensor) and/or a software component (e.g., software running on a computing device).

The video information may have been generated by one or more image sensors. An image sensor may include and/or may be coupled with one or more optical elements (e.g., lens). The video information may define images of a video based on light received within one or more fields of view of the image sensor(s) (e.g., fields of view of optical elements) during a capture period. For example, the video information may define images of a video based on light received within a field of view of a single image sensor during a capture period. The video information may define images of a panoramic video based on light received within a field of view of a single panoramic image sensor or within fields of view of multiple image sensors during a capture period. For example, the video information may define images of a spherical video based on light received within fields of view of multiple image sensors. Images of the spherical video may be comprised of multiple sub-images, which are generated by individual image sensors and stitched together to form the spherical images/video.

The video information component 102 may be configured to obtain video information during capture of the images/video and/or after capture of the images/video by one or more image sensors. For example, the video information component 102 may access video information while the images/video is being captured by one or more image sensors. The video information component 102 may access video information after the images/video has been captured and stored in memory (e.g., the electronic storage 12, buffer memory). In some implementations, the video information obtained by the video information component 102 may include raw video information generated from one or more image sensors' capture of the images/video.

The motion component 104 may be configured to obtain motion information of the image sensor and/or other information. Obtaining the motion information may include one or more of accessing, acquiring, analyzing, determining, examining, locating, receiving, retrieving, reviewing, storing, and/or otherwise obtaining the motion information. The motion information of the image sensor may characterize motion of the image sensor during the capture period. In some implementations, the motion information may be generated by one or more motion sensors and/or other sensors. A motion sensor may include one or more of an inertial measurement unit (e.g., 3-DOF inertial measurement unit, 6-DOF inertial measurement unit, 9-DOF inertial measurement unit), an accelerometer, a gyroscope, a magnetometer, a distance sensor (e.g., infrared distance sensor, LIDAR, ultrasonic distance sensor), a position sensor (e.g., global positioning system), and/or other motion sensors. In some embodiments, a motion sensor may generate motion information based on forces/acceleration experienced by the image sensor/motion sensor. In some embodiments, a motion sensor may generate motion information based on communication with another device.

An image sensor may include six degrees of freedom: three degrees of axial rotations and three axes of linear translations The motion information may characterize the motion of the image sensor for some or all of the six degrees of freedom of the image sensor. In some implementations, the motion information may characterize the motion of the image sensor along one or more of three axes (of linear translations) that are perpendicular to each other. For example, the motion information may characterize the motion of the image sensor along a top-down axis (e.g., top-down motion), a left-right axis (e.g., left-right motion), and/or a front-back axis (e.g., front-back motion). Other axes are contemplated.

Figure 3:
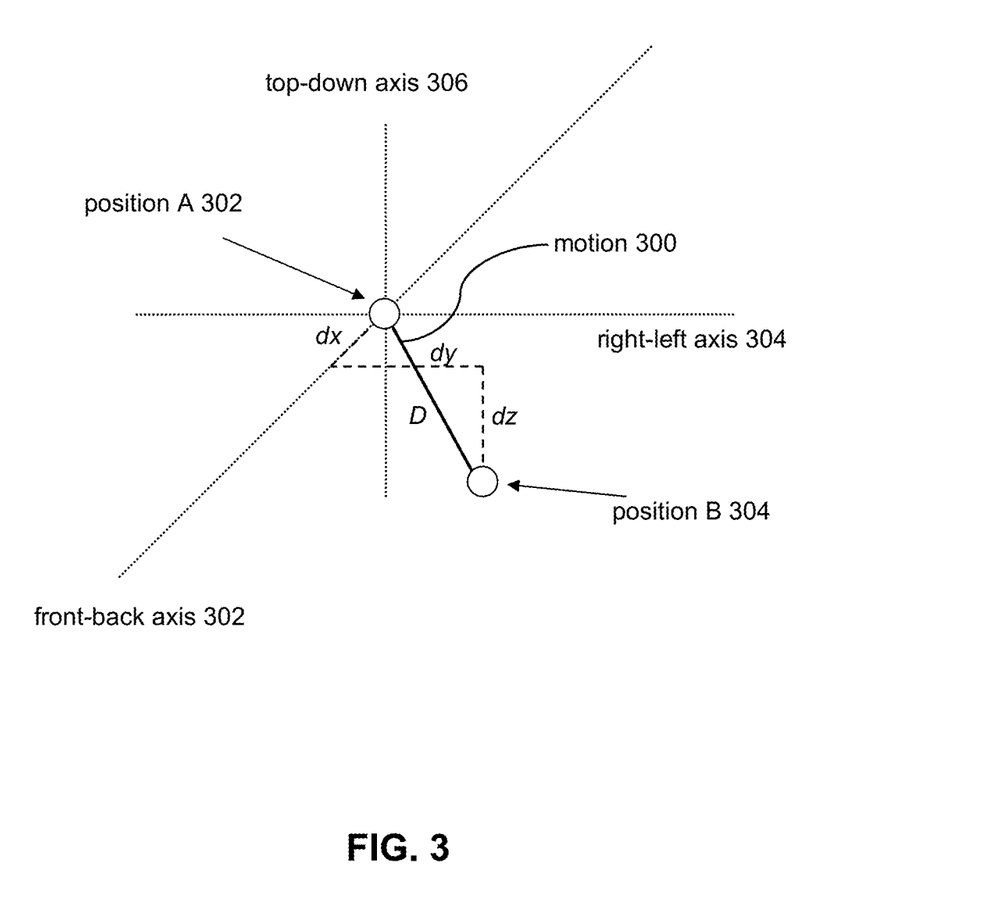
FIG. 3 illustrates an example translational motion of a camera.

For example, FIG. 3 illustrates an example motion 300 of an image sensor (e.g., camera including one or more image sensors and one or more optical elements). The motion 300 may result in change in positions of the image sensor between two moments within a capture period. The image sensor may be held by a user, carried by a moving object (e.g., vehicle, drone), attached to a mount, and/or otherwise supported during capture of a video (during the capture period). The motion 300 of the image sensor may cause the image sensor to move from a position A 302 to a position B 304.

The position component 106 may be configured to estimate relative positions of the image sensor between different moments within the capture period based on the motion information and/or other information. The position component 106 may determine a change in position of the image sensor between different moments within the capture period. The change in positions of the image sensor may be characterized by one or more distances between different positions of the image sensor at different moments within the capture period.

For example, referring to FIG. 3, at a first (e.g., earlier) moment within the capture period, the image sensor may have been located at the position A 302. At a second (e.g., later) moment within the capture period, the image sensor may have been located at the position B 304. The image sensor may have undergone the motion 300 to change its position from the position A 302 to the position B 304. The motion 300 may include a change in position (dx) along the front-back axis 302, a change in position (dy) along the right-left axis 304, and a change in position (dz) along the top-down axis 306. The motion 300 may be characterized by the motion information, and the position component 106 may estimate the relative positions of the image sensor between the first moment and the second moment based on the motion information and/or other information. The change in positions of the image sensor between the position A 302 and the position B 304 may be characterized by a distance D and/or other information. The position component 106 may determine the distance (e.g., D) between the relative positions of the image sensor at the first moment, the second moment, and/or other moments based on the motion information and/or other information.

The depth information component 108 may be configured to determine depth information for one or more portions of an environment of the image sensor based on the video information generated at the different moments, the relative positions of the image sensor between the different moments, and/or other information. The depth information may characterize one or more distances between the image sensor and portion(s) of the environment around the image sensor. The depth information may be included within one or more depth maps. The depth information component 108 may determine depth information for portion(s) of the environment around the image sensor based on parallax of the portion(s) captured within the different video information (e.g., defining different images).

The depth information component 108 may obtain the first image (defined by the video information generated by the image sensor based on the light received within the field of view of the image sensor at the first moment), the second image (defined by the video information generated by the image sensor based on the light received within the field of view of the image sensor at the second moment), and/or other images generated by the image sensor at other moments. Because of the change in position of the image sensor, one or more objects within the environment of the image sensor may be located at different distances from the image sensor between the first moment and the second moment. Because of the change in position of the image sensor, the object(s) within the environment may be represented differently (e.g., at different positions, at different angles, at different sizes) within the first image and the second image.

For example, referring to FIG. 3, the depth information component 108 may determine depth information for one or more portions of the environment of the image sensor based on the video information (defining a first image) generated when the image sensor was located at the position A 302 (at a first moment), the video information (defining a second image) generated when the image sensor was located at the position B 304 (at a second moment), and the relative position of the image sensor between the position A 302 and the position B 304 (the distance D).

The depth information component 108 may determine the depth information for object(s) represented in the first image, the second image, and/or other images using parallax. The depth information may be determined based on (i) the distance (e.g., D) between the relative positions of the image sensor at the first moment and the second moment, and (ii) a comparison of the first image and the second image. The depth information component 108 may combine the motion of the camera with optical flow algorithms to extract the depth map for the portion(s) of the environment of the image sensor. For example, based on the distance between the image sensor positions when the image sensor captured image and the second image, disparity of the objects captured within the images may be determined. The disparity may be used to determine the depth information/generate the depth map.

For a system including multiple image sensors, the depth information component 108 may determine depth information for one or more portions of an environment of the image sensors based on the video information generated by multiple image sensors, and/or other information. For example, rather than obtaining images generated based on light received by a single image sensor at different moments, the depth information component 108 may obtain images generated based on light received at the same moment by image sensors in different locations/at different vantage points. The depth information component 108 may determine the depth information for object(s) represented in the images using parallax. The depth information may be determined based on (i) the distance between the positions of the image sensors that captured the images at the same moment, and (ii) a comparison of the images (e.g., stereo mapping).

The correction component 110 may be configured to apply a translational motion correction to one or more of the images of the video based on the depth information, the relative positions of the image sensor, and/or other information. The translational motion correction may warp the one or more of the images to compensate for translational motion of the image sensor during the capture period and to stabilize the video. For example, referring to FIG. 3, the translational motion correction may warp one or more images taken by the image sensor (e.g., image taken from the position A 302, image taken from the position B 304) to compensate for the motion (dx) along the front-back axis 302, the motion (dy) along the right-left axis 304, and the motion (dz) along the top-down axis 306.

Within the image sensor/camera reference system, the translational motion of the image sensor may translate into opposite motion of the object space. The translational motion correction may include correcting apparent object space motion by warping individual pixels within the sensor plane. Depth map may provide information on which pixels needs to be warped and how to warp (e.g., stretch, compress, move) the pixels.

Figure 4:
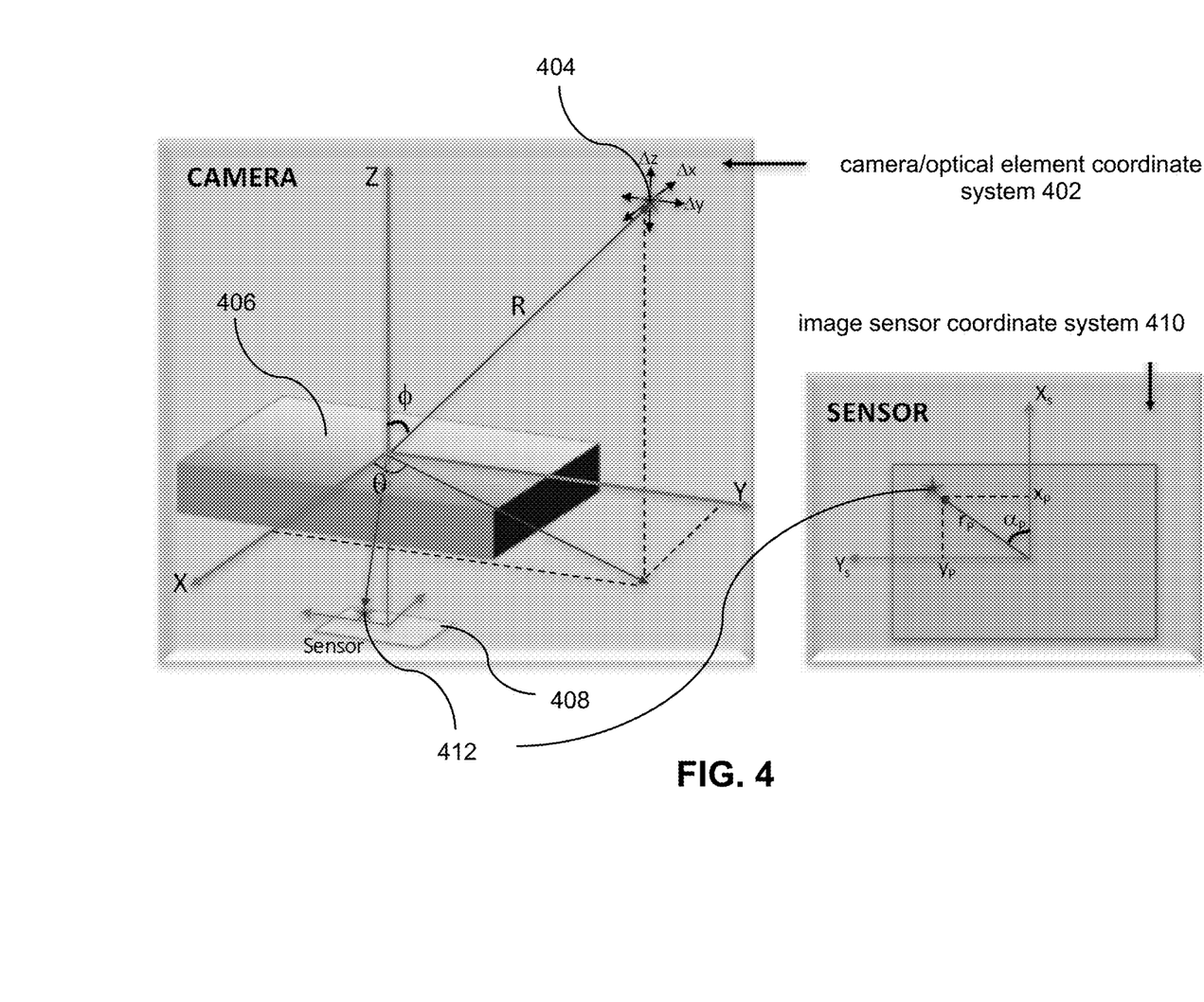
FIG. 4 illustrates an example camera/optical element coordinate system and an example image sensor coordinate system.

FIG. 4 illustrates an example camera/optical element coordinate system 402 and an example image sensor coordinate system 410. Measurements within the camera/optical element coordinate system 402 may be provided using spherical coordinate and measurements within the image sensor coordinate system 410 may be provided using polar coordinates. A point 404 may be R distance from the image sensor 406. Light traveling from the point 404 may be directed by the optical element 406 to a point 412 on the sensor plane 408 of the image sensor.

The position of the point 412 on the sensor plane 408 may be defined as $P(x_p, y_p)$, with corresponding polar coordinates $$r_P = \sqrt{x_P^2 + y_P^2}, \text{ and } \alpha_P = \tan^{-1}\left(\frac{y_P}{x_P}\right).$$

The point 412 may correspond to the point 404 in spherical coordinates $\theta = \alpha_P$ and $\phi = D_{(r_P)}^{-1}$, where the lens distortion equation ties $r_p$ and $\phi$: $r_P = D_{(\phi)}$.

For rotational motion correction, the rotation motion of the image sensor around three axes (e.g., X, Y, Z) may be used. In camera/optical element coordinate system 402, the angular velocity of the object space may be given by:

$$\vec{\omega} = -\sin\theta\dot{\phi}\hat{x} + \cos\theta\dot{\phi}\hat{y} + \dot{\theta}\hat{z} = -\omega_x\hat{x} - \omega_y\hat{y} - \omega_e\hat{z}$$

Based on the angular velocities ($\omega_x$, $\omega_y$, $\omega_z$), augular dependencies may be determined:

$$\begin{cases} \Delta\theta = -\omega_z\Delta t \\ \Delta\phi = \sqrt{\omega_x^2 + \omega_y^2}\,\Delta t \end{cases} \quad (42)$$

Further, sensor polar coordinate corrections may be applied:

$$\begin{cases} -\Delta\alpha_P = -\Delta\theta = \omega_z\Delta t \\ -\Delta r_P = -\dfrac{\partial D_\phi}{\partial \phi}\Delta\phi = -D'_\phi\sqrt{\omega_x^2 + \omega_y^2}\,\Delta t \end{cases} \quad (44)$$

For translational motion correction, translational motion ($\Delta X$, $\Delta Y$, $\Delta Z$) of the image sensor along three axes X, Y, Z may turn into an inverse apparent motion of an object space. Keeping just the first order effects (assuming the amplitudes of motion/jitter to be small), changes in spherical coordinates may be given by:

$$\begin{pmatrix} \Delta R \\ \Delta\theta \\ \Delta\phi \end{pmatrix} = \begin{pmatrix} \cos\theta\sin\phi & \sin\theta\sin\phi & \cos\phi \\ -\dfrac{\sin\theta}{R\sin\phi} & \dfrac{\cos\theta}{R\sin\phi} & 0 \\ \dfrac{\cos\theta\cos\phi}{R} & \dfrac{\sin\theta\cos\phi}{R} & -\dfrac{\sin\phi}{R} \end{pmatrix}\begin{pmatrix} -\Delta X \\ -\Delta Y \\ -\Delta Z \end{pmatrix}. \quad (46)$$

Based on $\theta$, $\phi$, and $\Delta X$, $\Delta Y$, $\Delta Z$, the relative object angular motion may be given by a formulation requiring R, the distance to the point 404, which may be determined based on the depth map:

$$\begin{cases} \Delta\theta = \dfrac{\sin\theta}{R\sin\phi}\Delta X - \dfrac{\cos\theta}{R\sin\phi}\Delta Y \\ \Delta\phi = -\dfrac{\cos\theta\cos\phi}{R}\Delta X - \dfrac{\sin\theta\cos\phi}{R}\Delta Y + \dfrac{\sin\phi}{R}\Delta Z \end{cases} \quad (48)$$

In some implementations, the translational motion correction may be applied to one or more of the images further based on distances between the image sensor and the portion(s) of the environment of the image sensor. The translational motion correction may warp (e.g., stretch, compress, move) pixels corresponding to the portion(s) of the environment based on how far the portion(s) are from the image sensor (e.g., optical element, camera). Limiting translational motion correction to pixels corresponding to the portion(s) of the environment at a certain distance from the image sensor may increase the speed of correcting image(s) for translational motion.

For example, applying the translational motion correction further based on the distances between the image sensor and the portion of the environment of the image sensor may include: (1) obtaining a threshold distance; (2) identifying pixels of one or more of the images corresponding the portion of the environment located within the threshold distance of the image sensor; and (3) warping the identified pixels of the one or more of the images. Applying the translational motion correction to those pixels corresponding to the portion of the environment within the threshold distance may provide a balance between providing sufficient translational motion correction while expending acceptable amount of computing resources (e.g., time, power). In some implementations, the threshold distance may be determined based on the image sensor motion profile.

An example threshold distance determination is provided below for a hemispherical lens (180°). For this example, translational motion correction may be applied where pixels corrections needed are greater than 1 pixel distance apart. Other values are contemplated. An image sensor may have a sensor height SH and width SW (>=SH), as well as pixels of pitch p. For simplicity sake, the horizon line lies along a circle spanning the entire sensor height SH. The lens distortion may be D($\phi$), a polynomial function of incident angle $\phi$.

Figure 5:
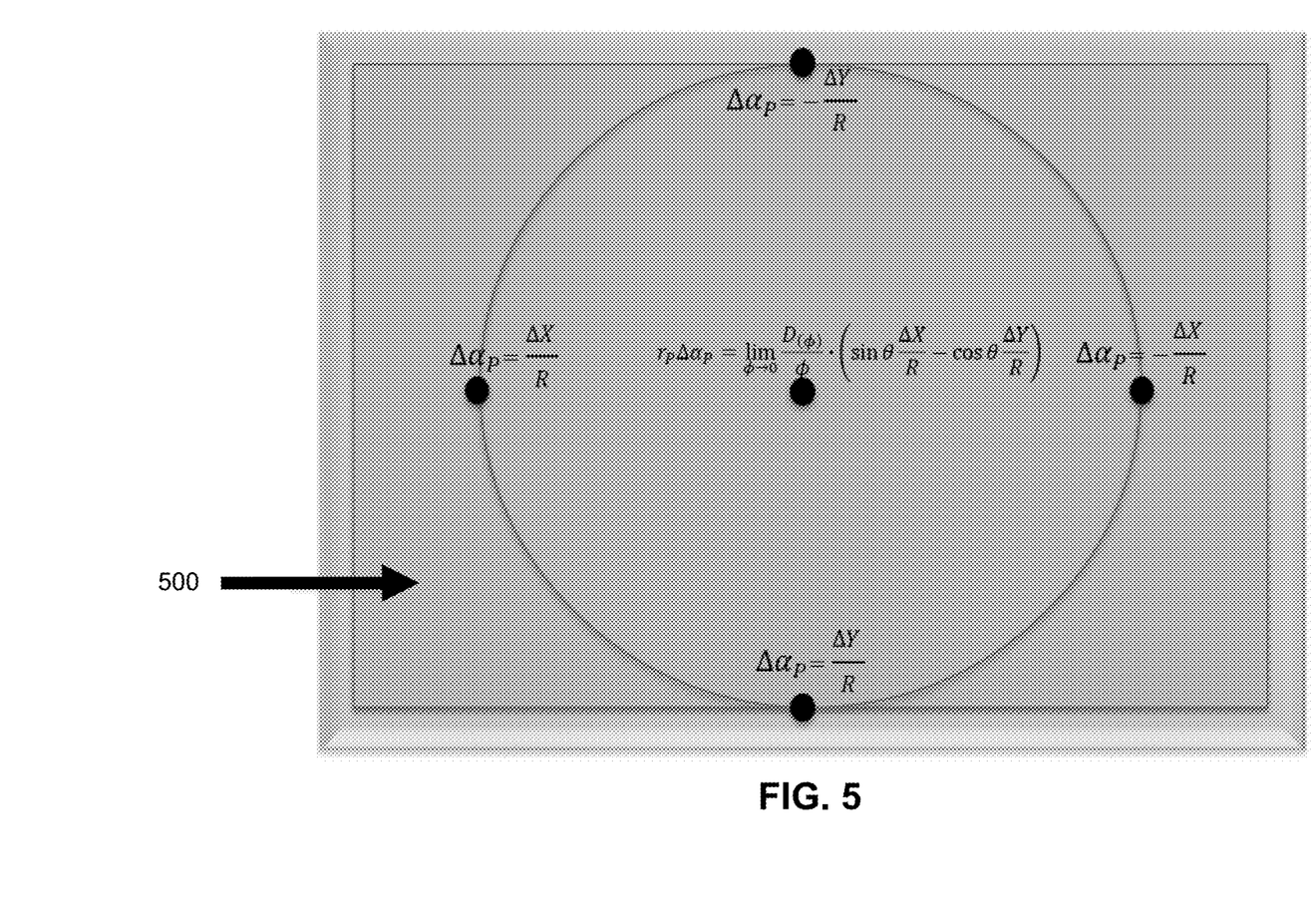
FIGS. 5-6 illustrate example image circles.

FIG. 5 shows an example image circle 500. The angular component correction ($\Delta\alpha_P$) as a function of camera translations ($\Delta X$, $\Delta Y$) in the image circle 500 may be given by:

$$\Delta\alpha_P = \Delta\theta, \text{ where } \Delta\theta = \frac{1}{\sin\phi}\left(\sin\theta\frac{\Delta X}{R} - \cos\theta\frac{\Delta Y}{R}\right) \quad (53)$$

with simplified solutions along the 180° horizon:

$$|\Delta\alpha_P| = \frac{|\Delta X| \text{ to } |\Delta Y|}{R}, \text{ and}$$

$$r_P \cdot \Delta\alpha_P = \lim_{\phi\to 0}\frac{D(\phi)}{\sin\phi}\cdot\left|\sin\theta\frac{\Delta X}{R} - \cos\theta\frac{\Delta Y}{R}\right|$$

angular correction in the image center.

Figure 6:
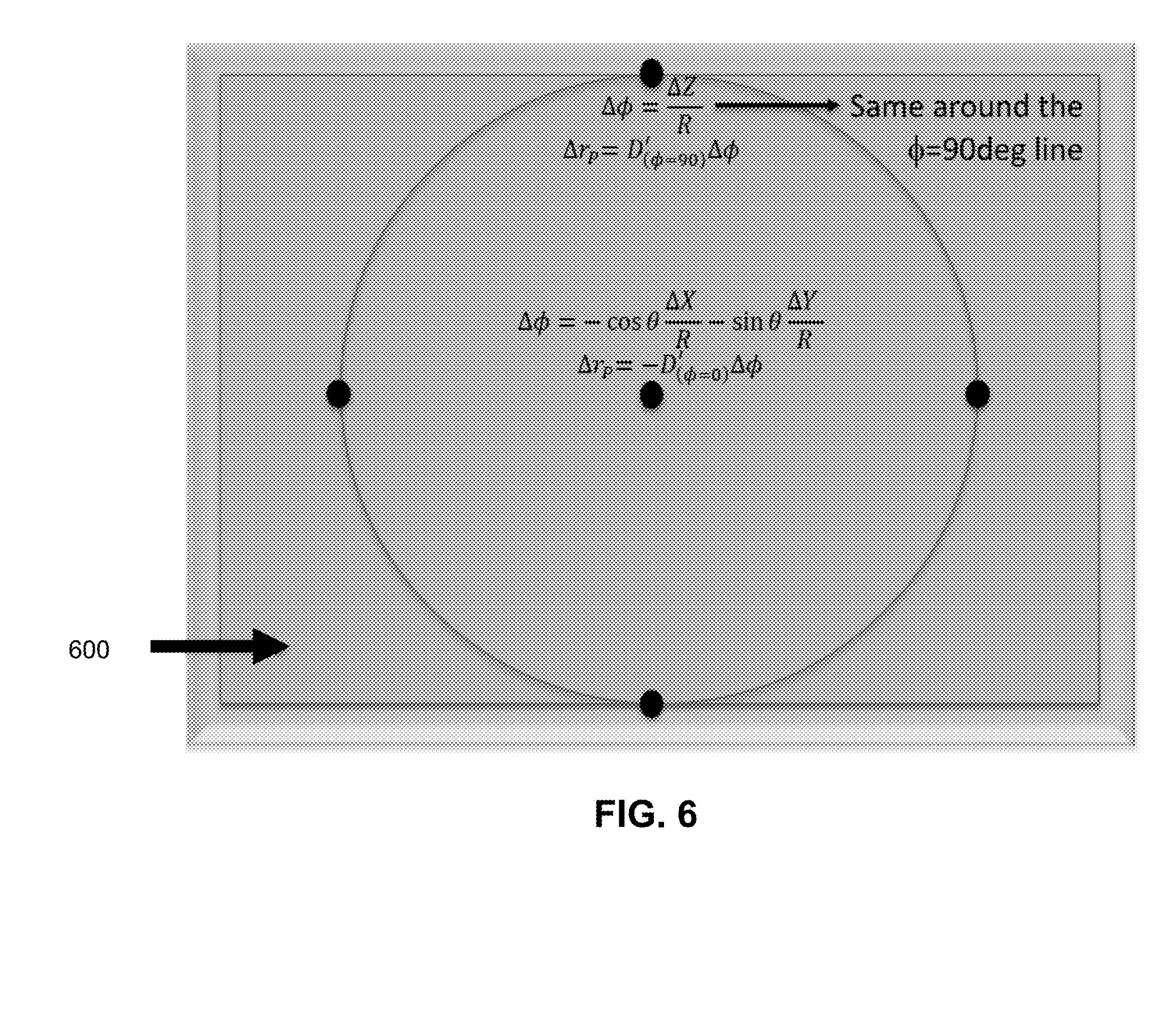

FIG. 6 shows an example image circle 600. The radial component correction ($\Delta r_P$) in the image circle 600 may be given by:

$$\Delta r_P = \frac{\partial D_\phi}{\partial \phi}\Delta\phi, \text{ where} \quad (56)$$

$$\Delta\phi = -\cos\theta\cos\phi\frac{\Delta X}{R} - \sin\theta\cos\phi\frac{\Delta Y}{R} + \sin\phi\frac{\Delta Z}{R}$$

For the above, the simplified solutions along the horizon line and in the image center become $$\Delta r_{P|horizon} = D'_{(\phi=90)}\frac{\Delta Z}{R}, \text{ and}$$

$$\Delta r_{P|center} = -D'_{(\phi=0)}\left(\cos\theta\frac{\Delta X}{R} + \sin\theta\frac{\Delta Y}{R}\right).$$

Considering the magnitude of the angular component first, starting from the center of the image all the way to the horizon line, and given the 1-pixel minimum correction criterion, the useful object distance that will require corrections to be applied may be computed.

$$\left.\begin{array}{l} r_P|\Delta\alpha_P| \geq p \\ r_P = D_{(\phi\to 0)} \\ \Delta\alpha_P = \dfrac{\sin\theta\cdot\Delta X - \cos\theta\cdot\Delta Y}{R\sin\phi} \end{array}\right\} \xrightarrow{\text{yields}} \quad (59)$$

$$R \leq \frac{|\sin\theta\cdot\Delta X - \cos\theta\cdot\Delta Y|}{p}\lim_{\phi\to 0}\frac{D_{(\phi)}}{\sin\phi},$$

which is generally proportional to the magnitude of the camera translations, to the first order term in the distortion polynomial, and inversely proportional to the pixel pitch.

For relatively small camera vibrations/translations in between frames (e.g. 3 mm at 30 fps), a pixel pitch between 1-2 μm, and a distortion polynomial with first order term between 1-2 mm (in line with a 1/2.3" sensor size), an object distance of interest of 4 m may be obtained, up to which angular component corrections around the image center may be necessary.

Repeating the exercise for the angular component correction at the horizon line may result in $$R \leq \frac{|\Delta X \text{ or } \Delta Y|}{p}\cdot\frac{SH}{2},$$

again proportional to the magnitude of the camera translations and inversely proportional to the pixel pitch, and proportional to the sensor height.

Working with the same system described above, an object distance of interest of 4 m may be obtained, up to which angular component corrections around the horizon line may be necessary.

Turning to the radial component corrections, these may be given by:

$$\Delta r_P = -D'_{(\phi)}\left(\frac{\cos\theta\cdot\Delta X + \sin\theta\cdot\Delta Y}{R}\right) \geq p$$

at the image center, yielding R<4 m, and $$\Delta r_P = D'_{(\phi)}\frac{\Delta Z}{R} \geq p$$

on the horizon line, which yields R<2 m.

Thus, for the system considered with small image sensor (e.g., optical element, camera) vibrations (e.g., maximum of about 10 cm/sec) that take place in 1/30 Hz time frame between frames (about 3 mm), the one pixel criterion may lead to translational motion corrections to be applied if the portion of the environment captured within the image is within a distance R<4 m, for both the angular and radial components.

The occlusion component 112 may be configured to determine an occlusion map based on the depth information, the translational motion correction, and/or other information. The occlusion map may characterize one or more gap regions within a given image of the one or more of the images after the application of the translational motion correction. A gap region may refer to one or more regions for which the given image does not have information. A gap region may refer to one or more regions for which the given image did not visually capture the environment around the image sensor.

In some implementations, the gap region(s) may be filled using visual captured within the given image (e.g., stretch, clone, enlarge portion(s) of the given image to cover the gap region(s)). In some implementations, the gap region(s) may be filled using visual captured within other image(s) (e.g., copy/stretch the pixel(s)/portion(s) corresponding to the gap region(s) into the gap region(s)). In some implementations, the gap region(s) may be filled using visual captured within the given image and visual captured within other images. For a system with multiple image sensors (e.g., stereo vision system), the gap region(s) may be filled based on one or more pixels of image(s) captured by image sensor(s) other than the image sensor that captured the given image—that is, one or more images sensors may offer alternative/additional pixels for gap region filling. In some implementations, filling the gap region may include application of computer vision algorithms to understand and project motion of dynamic objects within the image.

Figure 7:
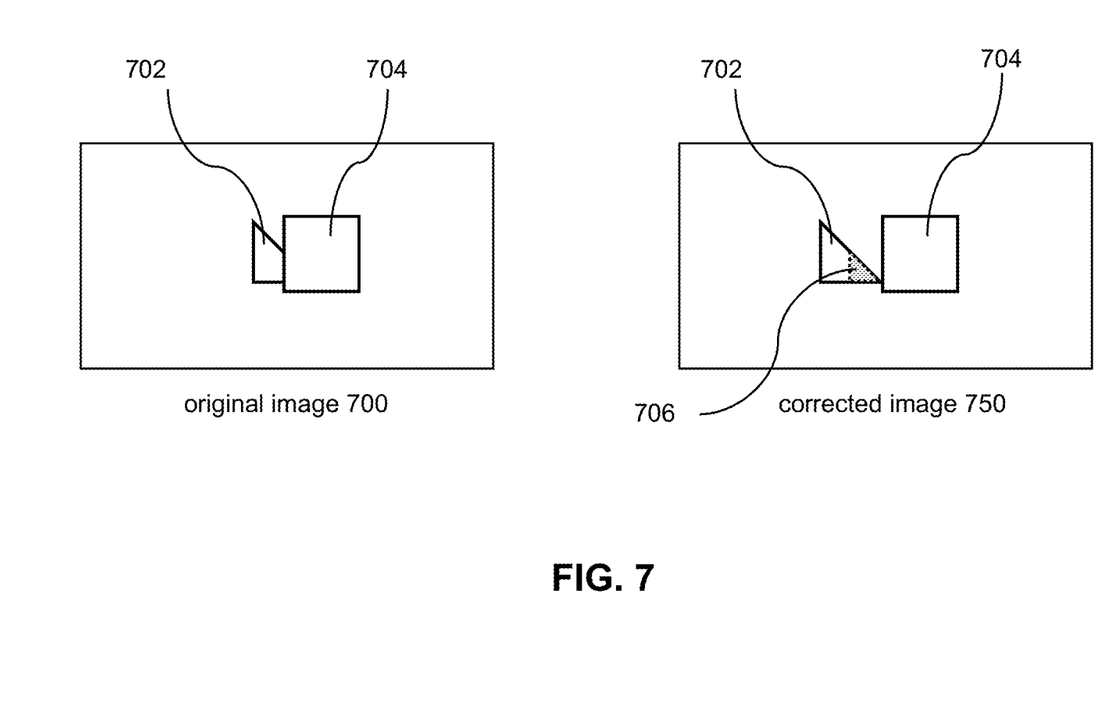
FIG. 7 illustrates an example original image and an example corrected image.

For example, FIG. 7 illustrates an example original image 700 and an example corrected image 750. The original image 700 may show an image before application of translational motion correction. The corrected image 750 may show an image after translational motion correction has been applied to the original image 700. In the corrected image 750, the translational motion correction may have compensated for the image sensor's translational motion to the right when it captured a triangular object 720 and a square object 704. The triangular object may have been further away from the image sensor than the square object 704, and the image sensor's translational motion to the right may have resulted in the original image 700 including a view of the triangular object 702 being partially hidden by the square object 704.

The corrected image 750 may be a result of the pixels of the original image 700 being warped (e.g., stretch, compress, move) to compensate for the translational motion of the image sensor. The translational motion correction may result in the triangle object 702 not being hidden by the square object 704. Such correction may provide for stabilization of the video (e.g., reduce jitter between displaying of the corrected image and the prior/subsequent frame to the corrected image). However, the original image 700 may not include information (e.g., visual capture) of a gap region 706 of the triangle object 702.

In some implementations, one or more gap regions may be filled based on one or more pixels of the given image. For example, referring to FIG. 7, the gap region 706 may be filled by stretching, cloning, enlarging portion(s), and/or otherwise manipulating the original image 700 to cover the gap region 706.

In some implementations, one or more gap regions may be filled based on one or more pixels of an image other than the given image. For example, referring to FIG. 7, the gap region 706 may be filled by copying/stretching pixel(s)/portion(s) of other prior images corresponding to the gap region 706 into the gap region 706. For example, before and/or after the original image 700 was captured, the image sensor may have captured one or more images that included capture of the gap region 706 of the triangle object 702. Those portions of the other image(s) may be used to fill the gap region 706.

While the description herein may be directed to videos, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
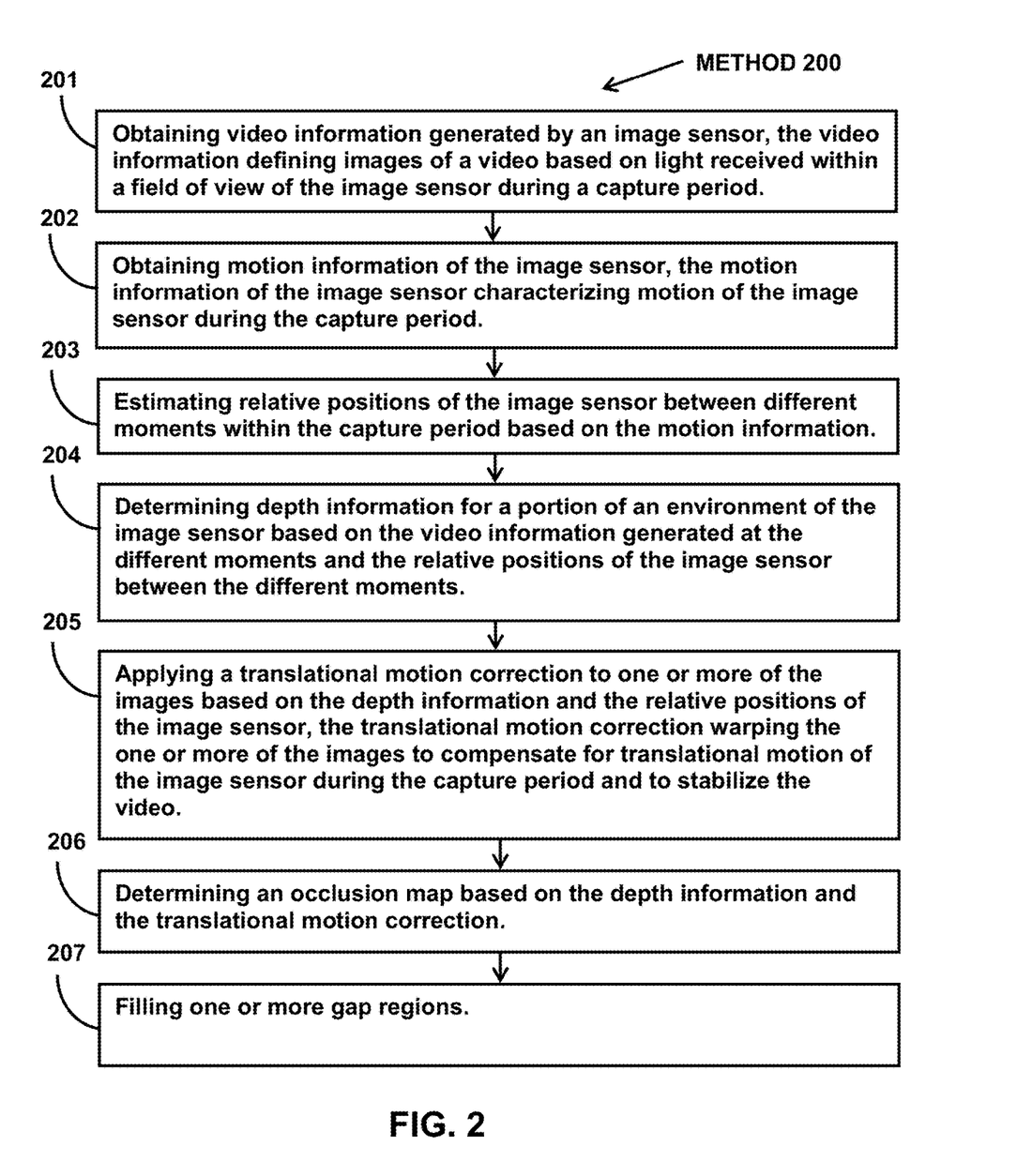
FIG. 2 illustrates a method for providing translational motion correction.

FIG. 2 illustrates method 200 for providing translational motion correction. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information generated by an image sensor may be obtained. The video information may define images of a video based on light received within a field of view of the image sensor during a capture period. In some implementation, operation 201 may be performed by a processor component the same as or similar to the video information component 102 (Shown in FIG. 1 and described herein).

At operation 202, motion information of the image sensor may be obtained. The motion information of the image sensor may characterize motion of the image sensor during the capture period. In some implementations, operation 202 may be performed by a processor component the same as or similar to the motion information component 104 (Shown in FIG. 1 and described herein).

At operation 203, relative positions of the image sensor between different moments within the capture period may be estimated based on the motion information. In some implementations, operation 203 may be performed by a processor component the same as or similar to the position component 106 (Shown in FIG. 1 and described herein).

At operation 204, depth information for a portion of an environment of the image sensor may be determined based on the video information generated at the different moments and the relative positions of the image sensor between the different moments. Alternatively, depth information may be determined via stereo vision depth mapping. In some implementations, operation 204 may be performed by a processor component the same as or similar to the depth information component 108 (Shown in FIG. 1 and described herein).

At operation 205, a translational motion correction may be applied to one or more of the images based on the depth information and the relative positions of the image sensor. The translational motion correction may warp the one or more of the images to compensate for translational motion of the image sensor during the capture period and to stabilize the video. In some implementations, operation 205 may be performed by a processor component the same as or similar to the correction component 110 (Shown in FIG. 1 and described herein).

At operation 206, an occlusion map may be determined based on the depth information and the translational motion correction. The occlusion map may characterize one or more gap regions within a given image of the one or more of the images after the application of the translational motion correction. In some implementations, operation 206 may be performed by a processor component the same as or similar to the occlusion component 112 (Shown in FIG. 1 and described herein).

At operation 207, one or more gap regions may be filled. The gap region(s) may be filled based on one or more pixels of the given image. The gap region(s) may be filled based on one or more pixels of an image other than the given image. For a system with multiple image sensors (e.g., stereo vision system), the gap region(s) may be filled based on one or more pixels of image(s) captured by image sensor(s) other than the image sensor that captured the given image. In some implementations, operation 207 may be performed by a processor component the same as or similar to the occlusion component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that provides translational motion correction for videos, the system comprising:
   one or more physical processors configured by machine-readable instructions to:
   obtain video information generated by an image sensor, the video information defining images of a video based on light received within a field of view of the image sensor during a capture period;
   obtain motion information of the image sensor, the motion information of the image sensor characterizing motion of the image sensor during the capture period;
   estimate relative positions of the image sensor between different moments within the capture period based on the motion information;
   obtain depth information for a portion of an environment of the image sensor, the depth information characterizing a distance between the image sensor and the portion of the environment of the image sensor; and
   apply a translational motion correction to one or more of the images based on the depth information and the relative positions of the image sensor, the translational motion correction warping the one or more of the images to compensate for translational motion of the image sensor during the capture period.

2. The system of claim 1, wherein the translational motion correction is applied to the one or more of the images further based on the distance between the image sensor and the portion of the environment of the image sensor.

3. The system of claim 2, wherein the one or more physical processors are, to apply the translational motion correction to the one or more of the images further based on the distance between the image sensor and the portion of the environment of the image sensor, further configured by the machine-readable instructions to:
   obtain a threshold distance;
   identify pixels of the one or more of the images corresponding the portion of the environment located within the threshold distance of the image sensor; and
   warp the identified pixels of the one or more of the images.

4. The system of claim 1, wherein the one or more physical processors are further configured to determine an occlusion map based on the depth information and the translational motion correction, the occlusion map characterizing one or more gap regions within a given image of the one or more of the images after the application of the translational motion correction.

5. The system of claim 4, wherein the one or more gap regions are filled based on one or more pixels of the given image.

6. The system of claim 4, wherein the one or more gap regions are filled based on one or more pixels of an image other than the given image.

7. The system of claim 1, wherein the motion information characterizes the motion of the image sensor along one or more of three axes that are perpendicular to each other.

8. The system of claim 1, wherein the one or more physical processors are, to obtain the depth information for the portion of the environment of the image sensor, further configured by the machine-readable instructions to determine the depth information for the portion of the environment of the image sensor based on the video information generated at the different moments and the relative positions of the image sensor between the different moments.

9. The system of claim 8, wherein the one or more physical processors are, to determine the depth information for the portion of the environment of the image sensor based on the video information generated at the different moments and the relative positions of the image sensor between the different moments, further configured by the machine-readable instructions to:
   determine a distance between the relative positions of the image sensor at two of the different moments, the two of the different moments including a first moment and a second moment;
   obtain a first image, the first image defined by the video information generated by the image sensor based on the light received within the field of view of the image sensor at the first moment;
   obtain a second image, the second image defined by the video information generated by the image sensor based on the light received within the field of view of the image sensor at the second moment; and
   determine the depth information for one or more objects represented in the first image and the second image based on (1) the distance between the relative positions of the image sensor at the first moment and the second moment, and (2) a comparison of the first image and the second image.

10. The system of claim 9, wherein the motion information is generated by one or more of an inertial measurement unit, an accelerometer, a gyroscope, a magnetometer, a distance sensor, and/or a position sensor.

11. A method for providing translational motion correction for videos, the method performed by a computing system including one or more physical processors, the method comprising:
   obtaining, by the computing system, video information generated by an image sensor, the video information defining images of a video based on light received within a field of view of the image sensor during a capture period;
   obtaining, by the computing system, motion information of the image sensor, the motion information of the image sensor characterizing motion of the image sensor during the capture period;
   estimating, by the computing system, relative positions of the image sensor between different moments within the capture period based on the motion information;
   obtaining, by the computing system, depth information for a portion of an environment of the image sensor, the depth information characterizing a distance between the image sensor and the portion of the environment of the image sensor; and
   applying, by the computing system, a translational motion correction to one or more of the images based on the depth information and the relative positions of the image sensor, the translational motion correction warping the one or more of the images to compensate for translational motion of the image sensor during the capture period.

12. The method of claim 11, wherein applying the translational motion correction to the one or more of the images is further based on the distance between the image sensor and the portion of the environment of the image sensor.

13. The method of claim 12, wherein applying the translational motion correction to the one or more of the images further based on the distance between the image sensor and the portion of the environment of the image sensor includes:
   obtaining a threshold distance;
   identifying pixels of the one or more of the images corresponding the portion of the environment located within the threshold distance of the image sensor; and
   warping the identified pixels of the one or more of the images.

14. The method of claim 11, further comprising determining an occlusion map based on the depth information and the translational motion correction, the occlusion map characterizing one or more gap regions within a given image of the one or more of the images after the application of the translational motion correction.

15. The method of claim 14, wherein the one or more gap regions are filled based on one or more pixels of the given image.

16. The method of claim 14, wherein the one or more gap regions are filled based on one or more pixels of an image other than the given image.

17. The method of claim 11, wherein the motion information characterizes the motion of the image sensor along one or more of three axes that are perpendicular to each other.

18. The method of claim 11, wherein obtaining the depth information for the portion of the environment of the image sensor includes determining the depth information for the portion of the environment of the image sensor based on the video information generated at the different moments and the relative positions of the image sensor between the different moments.

19. The method of claim 11, wherein determining the depth information for the portion of the environment of the image sensor based on the video information generated at the different moments and the relative positions of the image sensor between the different moments includes:
   determining a distance between the relative positions of the image sensor at two of the different moments, the two of the different moments including a first moment and a second moment;
   obtaining a first image, the first image defined by the video information generated by the image sensor based on the light received within the field of view of the image sensor at the first moment;
   obtaining a second image, the second image defined by the video information generated by the image sensor based on the light received within the field of view of the image sensor at the second moment; and
   determining the depth information for one or more objects represented in the first image and the second image based on (1) the distance between the relative positions of the image sensor at the first moment and the second moment, and (2) a comparison of the first image and the second image.

20. The method of claim 19, wherein the motion information is generated by one or more of an inertial measurement unit, an accelerometer, a gyroscope, a magnetometer, a distance sensor, and/or a position sensor.

* * * * *